(12) United States Patent
Kato et al.

(10) Patent No.: US 6,435,570 B1
(45) Date of Patent: Aug. 20, 2002

(54) RESIN PIPE JOINT

(75) Inventors: Masahide Kato; Noboru Tamaki; Hideo Shibahara, all of Yamatokoriyama (JP)

(73) Assignee: Toho Kasei Co., Ltd., Nara (JP)

( * ) Notice: Subject to any disclaimer, the term of this patent is extended or adjusted under 35 U.S.C. 154(b) by 0 days.

(21) Appl. No.: 09/831,070

(22) PCT Filed: Nov. 4, 1999

(86) PCT No.: PCT/JP99/06146
§ 371 (c)(1),
(2), (4) Date: May 4, 2001

(87) PCT Pub. No.: WO00/28251
PCT Pub. Date: May 18, 2000

(30) Foreign Application Priority Data

Nov. 6, 1998 (JP) .......................................... 10-316445

(51) Int. Cl.⁷ ............................................... F16L 25/00
(52) U.S. Cl. ..................... 285/334.5; 285/354; 285/331; 285/386
(58) Field of Search ................................ 285/354, 386, 285/334.5, 331

(56) References Cited

U.S. PATENT DOCUMENTS 3,628,815 A 12/1971 King

FOREIGN PATENT DOCUMENTS

| JP | 50-177714 | 12/1975 |
| JP | 61-179481 | 11/1986 |
| JP | 4-88294 | 3/1992 |
| JP | 4-132290 | 12/1992 |
| JP | 5-30684 | 4/1993 |
| JP | 6-159574 | 6/1994 |
| JP | 9-273673 | 10/1997 |

OTHER PUBLICATIONS

Patent Abstracts of Japan, Publication No. 04088294 A, Publication Date: Mar. 23, 1992, 1 page.
Patent Abstracts of Japan, Publication No. 09273673 A, Publication Date: Oct. 21, 1997, 1 page.
Patent Abstracts of Japan, Publication No. 06159574 A, Publication Date: Jun. 7, 1994, 1 page.

*Primary Examiner*—Lynne H. Browne
*Assistant Examiner*—Aaron M Dunwoody
(74) *Attorney, Agent, or Firm*—Rosenthal & Osha L.L.P.

(57) ABSTRACT

A resin pipe joint comprising a tapered flare portion (10a) formed on a pipe (10), an inclined portion (11a) formed internally of a joint body (11), an annular member (12) having inner peripheral surface fitted on the pipe (10) and the outer peripheral surface inserted in the joint body and formed at the end with a tapered chamfered portion (12a), and a pipe clamping member (13) threadedly fitted to the joint body (11). The pipe clamping member (13) being threadedly fitted to the joint body causes the chamfered portion (12a) of the annular member to pressure-contact the flare portion (10a) of the pipe and the flare portion of the pipe to pressure-contact the inclined portion in the interior of the joint body, whereby the clamping force can be concentrated on the flare portion of the pipe, so that a high sealing capability between the pipe and the joint body is obtained.

5 Claims, 3 Drawing Sheets

RESIN PIPE JOINT

TECHNICAL FIELD

The present invention relates to a resin pipe joint in which a flare portion of a pipe and a joint body are sealed. The present invention relates to a resin pipe joint applied to feeding, for example, ultra pure water, a high purity medical liquid or the like used for peripheral equipment in the production of semiconductor, and to piping in chemical industry.

BACKGROUND ART

As an example of a conventional resin pipe joint, FIG. 3 shows a cross-sectional view of a pipe joint made of fluororesin proposed in JP4 (1992)-132290U. In the resin pipe joint shown in FIG. 3, an inner ring 2 is pushed in the inside of the end portion of a tube 1. The inner side of a joint body 3 is fitted to the outer side of the end portion of the tube 1 and the end portion of the inner ring 2. A cap nut 4 is threadedly fitted to the joint body 3, thereby forming a first sealing portion 5 in which the inner ring 2 is pressed into contact with the joint body 3 and a second sealing portion 6 in which the inner ring 2 and the outer side of the end portion of the tube 1 are pressed into contact with a receiving port of the joint body 3.

Moreover, as another example of a conventional resin pipe, FIG. 4 shows a cross-sectional view of a pipe joint made of fluororesin proposed in JP7 (1995)-103949B. In the resin pipe joint shown in FIG. 4, a joint body 8 is fitted to an expanded-diameter portion 7a that was previously provided on the end portion of a tube 7.

The cap nut 9 is threadedly fitted to the joint body 8 by way of a female screw 9a formed on the cap nut 9 and a male screw formed on the joint body 8. The threaded fitting between the joint body 8 and the cap nut 9 causes the tube 7 to be pressed into contact with the inclined portion 8b of the joint body 8, thereby forming a sealing portion.

Furthermore, a concave portion 7b is provided on an inner surface of the tube 7 in the circumferential direction and a convex portion 8a is provided on an outer surface of the joint body 8a in the circumferential direction. The concave portion 7b is fitted to the convex portion 8a, and thereby the tube 7 is latched by the joint body 8, and the drop-off of the tube 7 from the joint body 8 is prevented.

However, the above-mentioned resin pipe joint has the following problems. Namely, in the resin pipe joint proposed in JP4 (1992)-132290U, the contact pressure generated when the cap nut 4 is threadedly fitted to the joint body 3 is spread over a side area including the first sealing portion 5, the second sealing portion 6 and an edge portion 4a of the cap nut 4.

Therefore, on the second sealing portion in which the receiving port of the joint portion 3 is in contact with the inner ring 2 in a large area, a sufficient contact-pressure may not be applied to the tube 1. In particular, in the case where a high temperature medical liquid is allowed to be circulating, the wall thickness of the tube 1 is reduced, for example, in the edge portion 4a of the cap nut 4, clearance occurs between the cap nut 4 and the inner ring 2. Consequently, the contact-pressure of the tube 1 further is lowered, which may cause the tube to drop off the joint body.

Furthermore, in the resin pipe joint proposed in JP7 (1995)-103949B, when the cap nut 9 is threadedly fitted to the joint body 8, since there is no guide structure for guiding the cap nut 9 straight with respect to the joint body 8, the cap nut 9 is rocked from side to side. Therefore, the cap nut 9 may threadedly be fitted to the joint body 8 with fitting between the female screw 9a formed on the cap nut 9 and the male screw 8c formed on the joint body 8 being insufficient. In the very worst case, the cap nut 9 is forced to be fitted threadedly to the joint body 8 with a thread being damaged, which may lead to leakage of the medical liquid during circulation.

DISCLOSURE OF INVENTION

The various embodiments of the present invention provide a resin pipe joint capable of securing a high sealing property, threadedly fitting a cap nut smoothly, and preventing the drop-off of the pipe and leakage of liquid.

In some embodiments, the resin pipe joint of the present invention includes a pipe and a joint body, the pipe being fixed in the joint body in a state in which the pipe being inserted into a through hole of the joint body, wherein a tapered flare portion is formed on the end portion of the pipe; the through hole of the joint body has an expanded-diameter portion and a reduced-diameter portion whose diameter is smaller than the diameter of the expanded-diameter portion; an inclined portion, which can be brought into contact with the flare portion of the pipe, is formed on a portion having a level difference between the expanded-diameter portion and the reduced-diameter portion; the pipe is inserted to the expanded-diameter portion so that the flare portion is brought into contact with the inclined portion; an annular member is inserted and attached to the inner peripheral surface of the expanded-diameter portion, and the through-hole of the annular member passes through the pipe; a screw portion of a pipe clamping member, which the screw portion is formed on the inner peripheral surface, is threadedly fitted to the screw portion formed on the outer peripheral portion of the joint body, whereby the pipe clamping member presses the annular member, a tapered chamfered portion formed on the end portion of the through hole of the annular member is pressed into contact with the flare portion of the pipe, the flare portion of the pipe is pressed into contact with the inclined portion of the joint body, an extending portion being integrated into the annular member is formed on the opposite side to the chamfered portion of the annular member, the extending portion guides the pipe clamping member while passing through an opening portion of the pipe clamping member when the pipe clamping member is threadedly fitted to the joint body, and and the end face of the extending portion and the end face of the pipe clamping member at the side of the extending portion are substantially in the same plane.

According to the such a resin pipe joint, clamping force by the pipe clamping member and the joint body can be concentrated on the flare portion of the pipe. Therefore, a high sealing property between the pipe and the joint body and to enhance the prevention of the drop-off of the pipe from the joint body can be obtained. Furthermore, when the pipe clamping member is clamped, it is possible to suppress a side-to-side rocking motion of the pipe clamping member, to carry out the threadedly fitting of the cap nut to the joint body smoothly, and to prevent a thread from being damaged due to the threadedly fitting.

Furthermore, when the pipe clamping member is threadedly fitted to the joint body, it is possible to utilize the location relationship in which the end face of the extending portion and the end face of the pipe clamping member of the side of the extending portion are in substantially the same plane as a guide for clamping the pipe clamping member. As a result, the clamping can be carried out efficiently.

In some aspects, the flange portion is formed on the end portion of the flare portion of the pipe. With such a resin pipe joint, it is possible to enhance the prevention of the drop-off of the pipe from the joint body.

In some aspects, the extending portion has an annular shape and has an outer diameter being smaller than the outer diameter of the annular member. According to such a resin pipe joint, it is possible to form an extending portion with a simple structure.

In some aspects, the pipe is made of resin and the flare portion is formed by thermally melting the end portion of the pipe. According to the above-mentioned resin pipe joint, as compared with the case where the flare portion is formed simply by thermal deformation or is formed by the deformation by force, the change in the size of the flare portion of the pipe that is a pressure-contact portion is reduced, and a sufficient strength for preventing the drop-off of the pipe from the joint body can be secured.

BEST MODE FOR CARRYING OUT THE INVENTION

Figure 1:
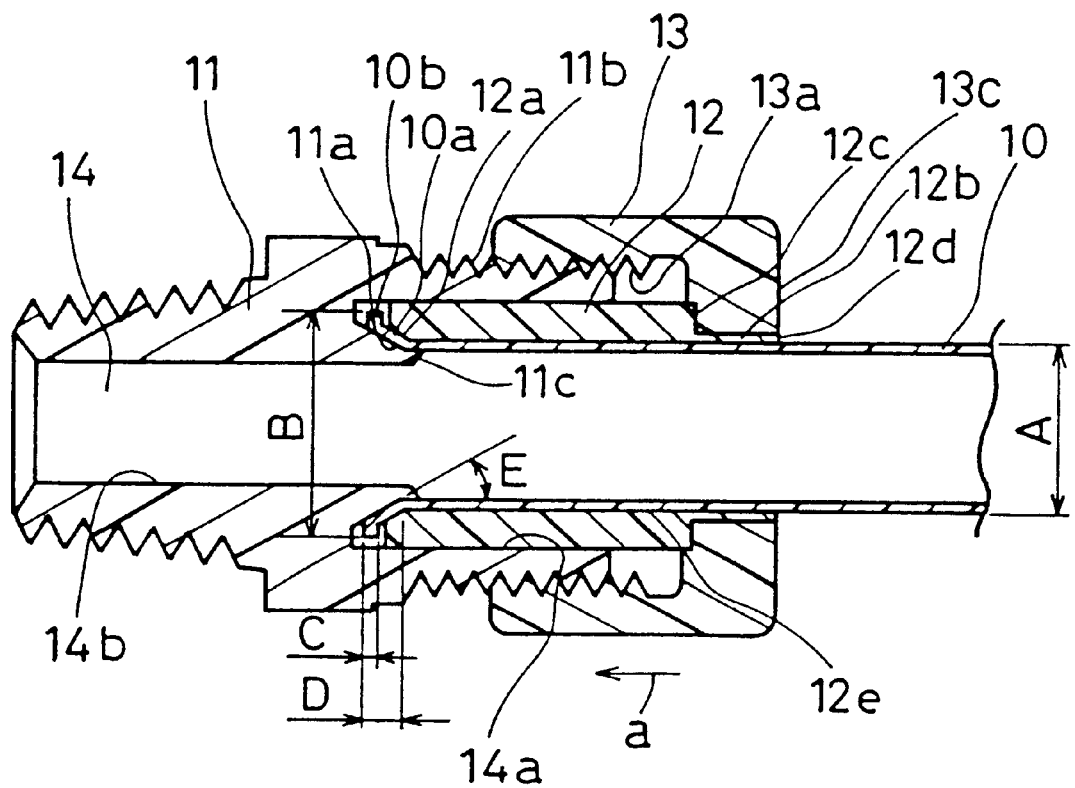
FIG. 1 is a cross-sectional view showing a resin pipe joint according to one embodiment of the present invention.

FIG. 1 is a cross-sectional view showing a resin pipe joint according to one embodiment of the present invention. FIG. 1 shows a state in which an end portion of the pipe 10 is fixed in the joint body 11. A tapered flare portion 10a is formed on the end portion of the pipe 10, and the flare portion 10a is provided with flange portion 10b. A joint body 11 is provided with a through hole 14, and the through hole has an expanded-diameter portion 14a and a reduced-diameter portion 14b whose diameter is smaller than that of the expanded-diameter portion 14a. An inclined portion 11a is formed on a portion having a level difference between the expanded-diameter portion 14a and the reduced-diameter portion 14b.

The size of each portion of the pipe 10 may be set as follows: for example, an outer diameter of the pipe: 25.4 mm (size A), a wall thickness of the pipe: 1.6 mm, an outer diameter of the flange portion of 32 mm (size B), a wall thickness of the flange portion: 2.0 mm (size C), a length of the flare portion: 5.0 mm (size D), and an inclined angle of the flare portion: 30° (angle E).

An annular member 12 is inserted and attached to the outside of the pipe 10. This attachment by insertion of the annular member 12 is carried out by inserting the through hole 12e of the annular member 12 through to the pipe 10. The end portion of the through hole 12e is provided with a tapered chamfered portion 12a. Furthermore, the opposite end portion to the chamfered portion 12a is provided with an annular extending portion 12b. Since the outer diameter of the extending portion 12b is smaller than that of the annular member 12, a flat portion 12c is formed on a boundary portion between the annular member 12 and the extending portion 12b.

A pipe clamping member 13 is fixed in the joint body 11. For the pipe clamping member 13, for example, a cap nut is used. Since the joint body 11 is provided with a male screw 11b and the pipe clamping member 13 is provided with a female screw 13a, the pipe clamping member 13 can threadedly be fitted to the joint body 11.

The pipe clamping member 13 is fitted threadedly to the joint body 11, and thereby the pipe clamping member 13 is shifted in the direction shown by an arrow a. Since the pipe clamping member 13 can be brought into contact with the annular member 12 in the flat portion 12c, the annular member 12 also is shifted in the direction shown by the arrow a in accordance as the pipe clamping member 13 is shifted in the direction shown by the arrow a.

By applying a predetermined torque to the pipe clamping member 13, the pipe clamping member 13 is pressed to the annular member 12. Consequently, the chamfered portion 12a of the annular member 12 is pressed into contact with the flare portion 10a of the pipe 10 and the flare portion 10a of the pipe 10 is pressed into contact with the inclined portion 11a inside the joint body 11. Furthermore, as materials of the pipe 10, the joint body 11, the annular member 12 and the pipe clamping member 13, for example, a fluororesin may be used in order to secure a drug resistance property and heat resistance property.

Figure 2:
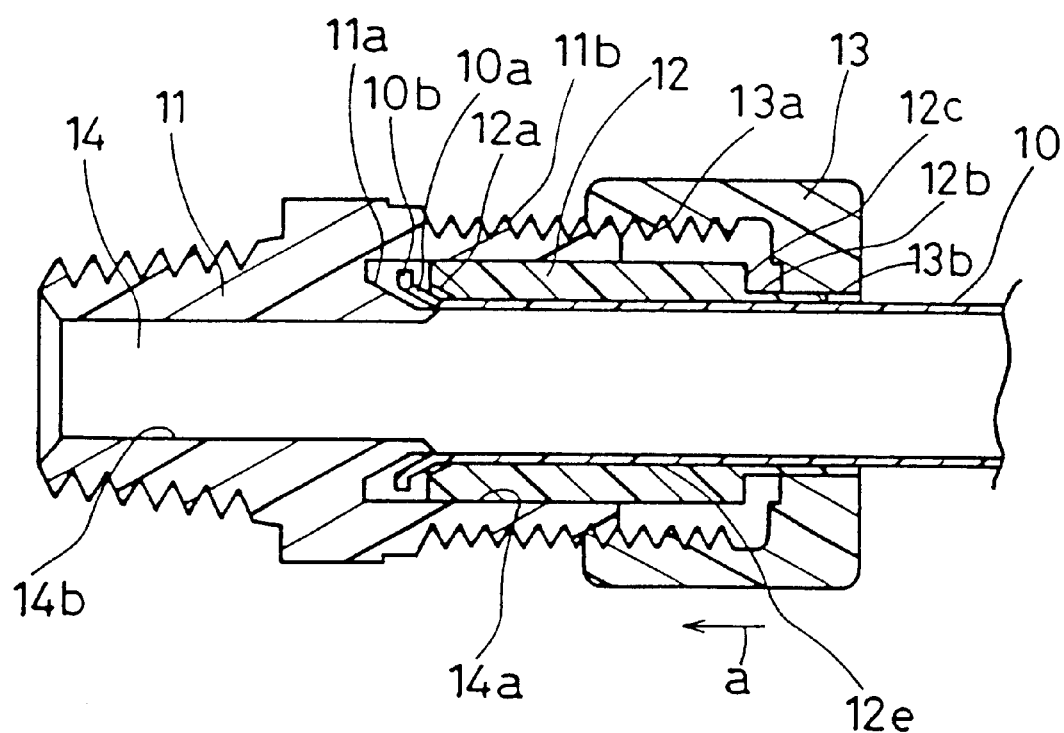
FIG. 2 is a cross-sectional view showing a state right after a pipe clamping member is started to be clamped to the joint body according to the resin pipe joint shown in FIG. 1 in the present invention.
Figure 3:
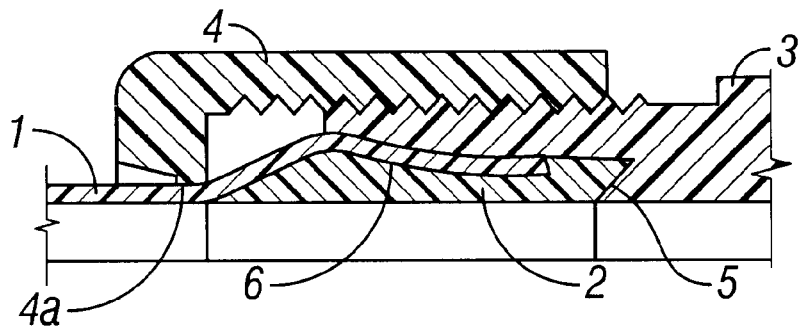
FIG. 3 is a cross-sectional view showing one example of a conventional resin pipe joint.
Figure 4:
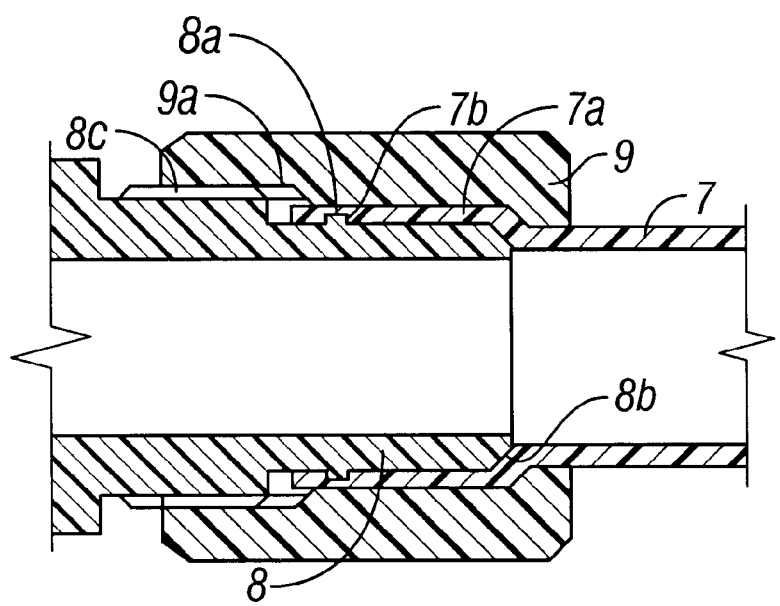
FIG. 4 is a cross-sectional view showing another example of a conventional resin pipe joint.

Hereinafter, the threadedly fitting of the pipe clamping member 13 to the joint body 11 and pressure contact of the pipe 10 to the joint body 11 will be described more specifically with reference to FIG. 2. FIG. 2 shows an example of a state right after the pipe clamping member 13 has begun to be clamped to the joint body 11. In the state shown in FIG. 2, a part of the extending portion 12b of the annular member 12 is inserted into an opening 13b of the pipe clamping member 13.

Since a gap between the outer peripheral surface of the annular member 12 and the inner peripheral surface of the joint body 11 is about 0.1 mm or less, the annular member 12 hardly rattles from side to side (in the direction of the diameter). Therefore, if the pipe clamping member 13 is clamped to the joint body 11, the extending portion 12b is inserted into the opening 13b of the pipe clamping member 13 very naturally.

When the pipe clamping member 13 is continued to be clamped further from the state shown in FIG. 2, the pipe clamping member 13 is shifted in the direction shown by the arrow a, the extending portion 12b is inserted further into the opening portion 13a. Therefore, the pipe clamping member 13 is shifted while being guided by the extending portion 12b.

Herein, a gap between the outer peripheral surface of the extending portion 12b and the inner peripheral surface of the opening portion 13b is approximately in the range from 0.1 mm to 0.2 mm. Therefore, when the pipe clamping member 13 is clamped, the side-to-side rocking motion of the pipe clamping member 13 can be prevented, and threadedly fitting can be carried out smoothly. Consequently, the female screw 13a formed on the cap nut 13 and the male screw 11b formed on the joint body 11 can be latched almost completely, thus preventing the thread from being damaged due to threadedly fitting.

Furthermore, as the pipe clamping member 13 is shifted further toward the direction shown by the arrow a, the pipe clamping member 13 is brought into contact with the flat portion 12c of the annular member 12, and the annular member 12 also is shifted toward the direction shown by the arrow a. As the shift is further continues, the chamfered portion 12a formed on the inner peripheral surface of the end portion of the annular member 12 is brought into contact with the flare portion 10a of the pipe 10, and thus, the pipe 10 also is shifted toward the direction shown by the arrow a.

As the pipe 10 is shifted further toward the direction shown by the arrow a, the flare portion 10a of the pipe 10 is brought into contact with an inclined portion 11a formed on the joint body 11. In this state, as shown in FIG. 1, the end face 13c of the pipe clamping member 13 and the end face 12d of the extending portion 12b of the annular member 12 are located in substantially the same plane.

This location relationship can be utilized as a guide for clamping the pipe clamping member 13. Namely, until the end force 12d of the extending portion 12b appeared in the vicinity of the end face 13c of the pipe clamping member 13, the pipe clamping member 13 is clamped directly by hand. Thereafter, the clamping member 13 is clamped is by the use of a toll until a predetermined torque is obtained. According to such a clamping method, since it is easy to determine the timing in which clamping by hand is finished, thus making a clamping work efficient.

By clamping the pipe clamping member 13 with a predetermined torque applied, the flare portion 10a is pressed into contact with the inclined portion 11a. Since the flare portion 10a is pressed only on the inclined portion 11a, the clamping pressure of the pipe clamping member 13 is concentrated on the portion where the inclined portion 11a is pressed into contact with the flare portion 10a, and thus a high sealing property can be obtained at this portion.

Furthermore, a flange portion 10b is formed on the end portion of the flare portion 10a of the pipe 10. The flange portion 10b functions for preventing a drop-off of the pipe 10. In a case where force is applied in the direction in which the pipe 10 is dropped off (the direction opposite to direction shown by the arrow a), the flange portion 10b and the end face of the annular portion 12 are in contact with each other, the vertical surface of the flange portion 10b plays a role as a stopper. In addition, by setting a wall thickness of the flange portion 10b to be larger than the clearance between the chamfered portion 12a of the annular member 12 and the inclined portion 11a of the joint body 11, it is possible to prevent the flange portion 10b from entering the clearance portion, thus enhancing the prevention of the drop-off of the pipe 10.

In the embodiment in which an example of the size is shown, the wall thickness C of the flange portion 10b (FIG. 1) is 2.0 mm, while the clearance between the chamfered portion 12a and the inclined portion 11a is 1.0 mm.

When the pipe 10 is made of resin, the flare portion 10a can be formed at the tip portion of the pipe 10 by thermal melting by the use of an exclusive jig. By forming the flare portion by thermal melting, when compared with the case where the flare portion is formed simply by thermal deformation or is formed by the deformation by force, the change in the size of the flare portion is smaller with respect to the temperature change of the fluid within the pipe. Therefore, it is possible to secure a sufficient strength for preventing the drop-off of the pipe from the joint body.

Furthermore, as shown in FIG. 1, if the inclined portion 11c is formed on the joint body 11, liquid is not likely to be retained in the joint portion between the pipe 10 and the joint body 11. Consequently, it is possible to prevent impurities from being accumulated.

Moreover, in the embodiment mentioned above, the case where the pipe is connected to one side of the joint body is explained, however, the pipe may be connected to both sides of the joint body by using the similar structure.

Furthermore, the case where the flange portion is formed on the flare portion of the pipe is explained, the flange portion may not be formed as long as the strength can be secured for preventing the drop-off of the pipe.

As mentioned above, according to the resin pipe joint of the present invention, sealing between the joint body and the end portion of the pipe can be carried out only on the flare portion formed of the pipe, whereby the clamping force by threadedly fitting the pipe clamping member to the joint body can be concentrated on the flare portion of the pipe. As a result, a high sealing property between the pipe and the joint body can be obtained, and it is possible to enhance the effect of preventing the drop-off of the pipe from the joint body.

Furthermore, by forming the extending portion for guiding the pipe clamping member on the annular member, it is possible to suppress the side-to-side rocking motion of the pipe clamping member when the pipe clamping member is clamped. Consequently, it is possible to achieve a smooth threadedly fitting and to prevent a thread from being damaged due to threaded fitting.

INDUSTRIAL APPLICABILITY

As mentioned above, according to the resin pipe joint of the present invention, a high sealing property can be obtained between the pipe and the joint body, and the effect of preventing the drop-off of the pipe from the joint body can be enhanced. Consequently, the resin pipe joint can be used for feeding, for example, ultra pure water, a high purity medical liquid or the like used for peripheral equipment in the production of semiconductors, and for laying pipes in chemical industry.

What is claimed is:

1. A resin pipe joint comprising:
   a pipe having a tapered flare portion formed on an end portion of the pipe;
   a joint body having a through hole, the through hole having an expanded-diameter portion and a reduced-diameter portion, the joint body further comprising:
   an inclined portion disposed between the expanded-diameter portion and the reduced-diameter portion, the inclined portion adapted to contact the tapered flare portion of the pipe;
   an annular member having a through hole attached to an inner peripheral surface of the expanded-diameter portion; and
   a pipe clamping member having a screw portion, wherein the screw portion is formed on the inner peripheral surface and is threadedly connected to a screw portion formed on an outer peripheral portion of the joint body,
   whereby the pipe is connected to the joint body by inserting the pipe into the through hole of the joint body as the pipe clamping member presses the annular member so that a tapered chamfered portion formed on the end portion of the through hole of the annular member is pressed into contact with the flare portion of the pipe, and the flare portion of the pipe is pressed into contact with the inclined portion of the joint body.

2. The resin pipe joint according to claim 1, wherein a flange portion is formed on an end portion of the flare portion of the pipe.

3. The resin pipe joint according to claim 1, wherein an extending portion being integrated into the annular member is formed on the opposite side to the chamfered portion of the annular member, the extending portion guides the pipe clamping member while passing through an opening portion of the pipe clamping member when the pipe clamping member is threadedly connected to the joint body.

4. The resin pipe joint according to claim 3, wherein the extending portion has an annular shape and has an outer diameter being smaller than the outer diameter of the annular member.

5. The resin pipe joint according to clam 1, wherein the pipe is made of resin and the flare portion is formed by thermally melting the end portion of the pipe.

* * * * *